(12) United States Patent
Song et al.

(10) Patent No.: US 8,897,203 B2
(45) Date of Patent: Nov. 25, 2014

(54) PHYSICAL UPLINK SHARED CHANNEL DEMODULATION REFERENCE SIGNAL DESIGN FOR UPLINK COORDINATED TRANSMISSION IN TYPE II RELAY USING A PUNCTURED DEMODULATION REFERENCE SIGNAL

(75) Inventors: Yi Song, Plano, TX (US); Yi Yu, Irving, TX (US); Zhijun Cai, Euless, TX (US); Dongsheng Yu, Nepean (CA); Chandra S. Bontu, Nepean (CA); Mo-Han Fong, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/388,919

(22) PCT Filed: Aug. 12, 2010
(Under 37 CFR 1.47)

(86) PCT No.: PCT/US2010/045379
§ 371 (c)(1),
(2), (4) Date: Jun. 27, 2012

(87) PCT Pub. No.: WO2011/019960
PCT Pub. Date: Feb. 17, 2011

(65) Prior Publication Data
US 2013/0064168 A1 Mar. 14, 2013

Related U.S. Application Data
(60) Provisional application No. 61/233,468, filed on Aug. 12, 2009.

(51) Int. Cl.
H04L 27/26 (2006.01)

(52) U.S. Cl.
CPC ........ *H04L 27/2613* (2013.01); *H04L 27/2611* (2013.01)
USPC .......................................................... 370/315

(58) Field of Classification Search
CPC ..... H04B 7/2606; H04B 7/155; H04W 88/04; H04W 16/26; H04L 2001/0097
See application file for complete search history.

(56) References Cited

U.S. PATENT DOCUMENTS 8,248,941 B2 * 8/2012 Teyeb et al. .................... 370/235
8,451,769 B2 * 5/2013 Lee et al. ....................... 370/315
(Continued)

FOREIGN PATENT DOCUMENTS

CN 101309134 A 11/2008
CN 101384078 A 3/2009
(Continued)

OTHER PUBLICATIONS

Sydir, J.; Taori, R., (Sydir et al.), An evolved cellular system architecture incorporating relay stations, "(Sydir hereinafter)," Communications Magazine, IEEE, vol. 47, No. 6, pp. 115, 121, Jun. 2009, doi: 10.1109/MCOM.2009.5116808.*

(Continued)

Primary Examiner — Andrew Lai
Assistant Examiner — Hoyet H Andrews
(74) Attorney, Agent, or Firm — Conley Rose, P.C.; Jonathan K. Polk; J. Robert Brown, Jr.

(57) ABSTRACT

A method is provided for providing an access node with a demodulation reference signal (DMRS). The method includes, when the UE and at least one relay node are present in a cell, the relay node transmitting the DMRS on a subset of a set of resource elements in which the UE transmits the DMRS.

30 Claims, 13 Drawing Sheets

(56) References Cited

U.S. PATENT DOCUMENTS

| | | | |
|---|---|---|---|
| 8,472,357 B2* | 6/2013 | Ali et al. | 370/280 |
| 8,477,633 B2* | 7/2013 | Park et al. | 370/241 |
| 8,477,675 B2* | 7/2013 | Cai et al. | 370/312 |
| 2007/0217353 A1* | 9/2007 | Asa et al. | 370/315 |
| 2008/0247375 A1 | 10/2008 | Muharemovic et al. | |
| 2008/0267165 A1 | 10/2008 | Bertrand et al. | |
| 2010/0323684 A1 | 12/2010 | Cai et al. | |
| 2011/0110310 A1* | 5/2011 | Cai | 370/328 |
| 2011/0128883 A1* | 6/2011 | Chung et al. | 370/252 |
| 2011/0194485 A1 | 8/2011 | Horneman et al. | |
| 2012/0243427 A1* | 9/2012 | Brisebois et al. | 370/252 |
| 2012/0300696 A1* | 11/2012 | Yi et al. | 370/315 |
| 2013/0034072 A1* | 2/2013 | Kim et al. | 370/329 |
| 2013/0107735 A1* | 5/2013 | Hoymann et al. | 370/252 |
| 2013/0176890 A1* | 7/2013 | Sharma et al. | 370/252 |
| 2013/0203416 A1* | 8/2013 | Raaf et al. | 455/436 |

FOREIGN PATENT DOCUMENTS

| | | |
|---|---|---|
| CN | 101400119 A | 4/2009 |
| CN | 101431355 A | 5/2009 |

OTHER PUBLICATIONS

Sydir, J.; Taori, R., (Sydir et al.), An evolved cellular system architecture incorporating relay stations," (Sydir hereinafter)," Communications Magazine, IEEE, vol. 47, No. 6, pp. 115, 121, Jun. 2009, doi: 10.1109/MCOM.2009.5116808.*

3GPP TS 36.211 V8.7.0 (May 2009), (3GPP 36.211), "3rd Generation Partnership Project; Technical Specification Group Radio Access Network; Evolved Universal Terrestrial Radio Access (E-UTRA); Physical Channels and Modulation (Release 8)", (3GPP 36.211 hereinafter).*

Caleb K. Lo, Sriram Vishwanath and Robert W. Heath, Jr., "Selection Strategies for Relay-Assisted Communication", Wireless Networking and Communications Group, Department of Electrical and Computer Engineering, The University of Texas at Austin, Submitted to the IEEE Communications Magazine, Jun. 15, 2008.*

Qualcomm Europe, titled, "Challenges with Type II Relay Operation," was presented as Agenda Item: 12.3, 3GPP TSG RAN WG1 Meeting #57, Document No. R1-092058, in San Francisco, CA, May 4-5, 2009, pp. 01-03.*

Parkvall, S.; Dahlman, E.; Furuskar, A.; Jading, Y.; Olsson, M.; Wanstedt, S.; Zangi, K., "LTE-Advanced—Evolving LTE towards IMT-Advanced," Vehicular Technology Conference, 2008. VTC 2008-Fall. IEEE 68th , vol., No., pp. 1,5, Sep. 21-24, 2008, doi: 10.1109/VETECF.2008.313.*

Pabst, Ralf; Walke, Bernhard H.; Schultz, D.C.; Herhold, P.; Yanikomeroglu, H.; Mukherjee, S.; Viswanathan, H.; Lott, M.; Zirwas, W.; Dohler, M.; Aghvami, H.; Falconer, D.D.; Fettweis, G.P., "Relay-based deployment concepts for wireless and mobile broadband radio," Communications Magazine, IEEE , vol. 42, No. 9, pp. 80,89, Sep. 2004.*

Nokia Siemens Networks, Nokia, titled "Backward compatible implementation of Relaying," (Nokia hereinafter) was presented as Agenda Item-11.5, Study Item on LTE-Advanced, Relaying, 3GPP TSG RAN WG1 #55, Document No. R1-084325, in Prague, Czech Republic, Nov. 10-14, 2008, pp. 01-03.*

Teyeb, O.; Vinh Van Phan; Raaf, B.; Redana, S., (Teyeb et al.), "Handover Framework for Relay Enhanced LTE Networks," (Teyeb hereinafter) Communications Workshops, 2009. ICC Workshops 2009, IEEE International Conference on, vol., No., pp. 01-05, Jun. 14-18, 2009, and doi: 10.1109/ICCW.2009.5208002.*

Nokia Siemens Networks, Nokia, titled "Backward compatible implementation of Relaying," (Nokia hereinafter) was presented as Agenda Item—11.5, Study Item on LTE-Advanced, Relaying, 3GPP TSG RAN WG1 #55, Document No. R1-084325, in Prague, Czech Republic, Nov. 10-14, 2008, pp. 1-3.*

Sydir, J.; Taori, R., (Sydir et al.), An evolved cellular system architecture incorporating relay stations,"(Sydir hereinafter)," Communications Magazine, IEEE, vol. 47, No. 6, pp. 115, 121, Jun. 2009, doi: 10.1109/MCOM.2009.5116808.*

Teyeb, O.; Vinh Van Phan; Raaf, B.; Redana, S., (Teyeb et al.), "Handover Framework for Relay Enhanced LTE Networks," (Teyeb hereinafter) Communications Workshops, 2009. ICC Workshops 2009, IEEE International Conference on, vol., No., pp. 1-5, Jun. 14-18, 2009, and doi: 10.1109/ICCW.2009.5208002.*

Song, Yi, et al., U.S. Appl. No. 13/389,420, filed Feb. 7, 2012; Title: Physical Uplink Shared Channel Demodulation Reference Signal Design for Uplink Coordinated Transmission in Type II Relay.

Shin, Oh-Soon, et al., "Design of an OFDM Cooperative Space-Time Diversity System"; IEEE; Jul. 2007; vol. 56, No. 4; 13 pages.

PCT International Search Report; Application No. PCT/US2010/045378; Dec. 28, 2010; 2 pages.

PCT Written Opinion of the International Searching Authority; Application No. PCT/US2010/045378; Dec. 28, 2010; 5 pages.

PCT Written Opinion of the International Preliminary Examining Authority; PCT Application No. PCT/US2010/045379; Aug. 22, 2011; 5 pages.

PCT International Search Report; PCT Application No. PCT/US2010/045379; Jan. 26, 2011; 3 pages.

PCT Written Opinion of the International Searching Authority; PCT Application No. PCT/US2010/045379; Jan. 26, 2011; 7 pages.

PCT International Preliminary Report on Patentability; PCT Application No. PCT/US2010/045379; Nov. 11, 2011; 37 pages.

3GPP TSG-RAN WG1 #57; "Challenges with Type II Relay Operation"; R1-092058; San Francisco, USA; May 4-8, 2009; 3 pages.

3GPP TSG RAN WG1 Meeting #57bis; "Type-II Relay DL/UL Transmission Schemes"; R1-092420; Los Angeles, USA; Jun. 29-Jul. 3, 2009; 8 pages.

3GPP TSG-RAN WG1 #56bis; "Further Consideration on L2 Transparent Relay"; R1-091403; Seoul, Korea; Mar. 23-27, 2009; 7 pages.

European Examination Report; Application No. 10751734.4; Nov. 14, 2012; 3 pages.

3GPP TSs 36.211 V8.9.0; 3rd Generation Partnership Project; Technical Specification Group Radio Access Network; Evolved Universal Terrestrial Radio Access (E-UTRA); Physical Channels and Modulation; Release 8; Dec. 2009; 83 pages.

3GPP TR 36.814 V9.0.0; 3rd Generation Partnership Project; Technical Specification Group Radio Access Network; Evolved Universal Terrestrial Radio Access (E-UTRA); Further Advancements for E-UTRA Physical Layer Aspects; Release 9; Mar. 2010; 104 pages.

3GPP TS 36.331 V9.3.0; 3rd Generation Partnership Project; Technical Specification Group Radio Access Network; Evolved Universal Terrestrial Radio Access (E-UTRA); Radio Resource Control (RRC); Protocol Specification; Release 9; Jun. 2010; 250 pages.

Canadian Office Action; Application No. 2,770,708; Jul. 15, 2013; 2 pages.

European Examination Report: Application No. 10751734.4; Oct. 24, 2013; 4 pages.

Chinese Office Action; Application No. 201080045946.X; Feb. 13, 2014; 10 pages.

3GPP TSG RAN1 #57; "Cooperation Scheme Considerations for Type II Relay"; R1-091710; San Francisco, US; May 4-8, 2009; 4 pages.

Chinese Office Action; Application No. 201080045952.5; Dec. 27, 2013; 21 pages.

3GPP TSG RAN WG1 Meeting #46; "Multiplexing Method for Orthogonal Reference Signals for E-UTRA Uplink"; R1-062101; Tallinn, Estonia; Aug. 28-Sep. 1, 2006; 13 pages.

3GPP TS 36.211 V8.6.0; 3rd Generation Partnership Project; Technical Specification Group Radio Access Network; Evolved Universal Terrestrial Radio Access (E-UTRA); Physical Channels and Modulation; Release 8; Mar. 2009; 22 pages.

Office Action dated Aug. 29, 2014; U.S. Appl. No. 13/389,420, filed Jun. 22, 2012; 54 pages.

Canadian Office Action; Application No. 2,770,857; Jul. 21, 2014; 3 pages.

* cited by examiner

PHYSICAL UPLINK SHARED CHANNEL DEMODULATION REFERENCE SIGNAL DESIGN FOR UPLINK COORDINATED TRANSMISSION IN TYPE II RELAY USING A PUNCTURED DEMODULATION REFERENCE SIGNAL

CROSS REFERENCE

This application is a filing under 35 U.S.C. 371 of International Application No. PCT/US2010/045379 filed Aug. 12, 2010, entitled "Physical Uplink Shared Channel Demodulation Reference Signal Design for Uplink Coordinated Transmission in Type II Relay Using a Punctured Demodulation Reference Signal" claiming priority to U.S. Provisional Application No. 61/233,468 filed on Aug. 12, 2009, entitled "Physical Uplink Shared Channel Demodulation Reference Signal Design for Uplink Coordinated Transmission in Type II Relay Using a Punctured Demodulation Reference Signal", which are incorporated by reference herein as if reproduced in their entirety.

BACKGROUND

As used herein, the terms "user equipment" and "UE" can refer to wireless devices such as mobile telephones, personal digital assistants, handheld or laptop computers, and similar devices that have telecommunications capabilities. Such a UE might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UE" may also refer to devices that have similar wireless capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long Term Evolution (LTE) and LTE-Advanced (LTE-A). For example, an LTE or LTE-A system might include an Evolved Universal Terrestrial Radio Access Network (E-UTRAN) or E-UTRAN node B (eNB), a wireless access point, or a similar component rather than a traditional base station. As used herein, the term "access node" will refer to any component of a wireless network, such as a traditional base station, a wireless access point, or an LTE or LTE-A eNB, that creates a geographical area of reception and transmission coverage allowing a UE or a relay node to access other components in a telecommunications system. An access node may comprise a plurality of hardware and software.

The term "access node" may not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or relay node. It is understood that a component might operate as an access node or a relay node depending on its configuration and placement. However, a component is called a "relay node" only if it requires the wireless coverage of an access node or other relay node to access other components in a wireless communications system. Additionally, two or more relay nodes may be used serially to extend or enhance coverage created by an access node.

These systems can include protocols such as a Radio Resource Control (RRC) protocol, which is responsible for the assignment, configuration, and release of radio resources between a UE and a network node or other equipment. The RRC protocol is described in detail in the Third Generation Partnership Project (3GPP) Technical Specification (TS) 36.331.

The signals that carry data between UEs, relay nodes, and access nodes can have frequency, time, space, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UE or network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is a diagram illustrating a resource block with a punctured demodulation reference signal according to an embodiment of the disclosure.

FIG. 4 is a diagram illustrating resource blocks with the same puncture pattern for a demodulation reference signal according to an embodiment of the disclosure.

FIG. 5 is a diagram illustrating resource blocks with different puncture patterns for a demodulation reference signal according to an embodiment of the disclosure.

FIG. 6 is a diagram illustrating resource blocks with orthogonal demodulation reference signals according to an embodiment of the disclosure.

FIG. 7 is a diagram illustrating resource blocks with three different orthogonal demodulation reference signals according to an embodiment of the disclosure.

FIG. 8 is a diagram illustrating resource blocks with different puncture patterns for a demodulation reference signal for two relay nodes and a different puncture pattern for a demodulation reference signal for a user equipment according to an embodiment of the disclosure.

FIG. 9 is a diagram illustrating resource blocks with different puncture patterns for a demodulation reference signal for a user equipment and two relay nodes according to an embodiment of the disclosure.

FIG. 10 is a diagram illustrating resource blocks using a combination of frequency division multiplexing and code division multiplexing according to an embodiment of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
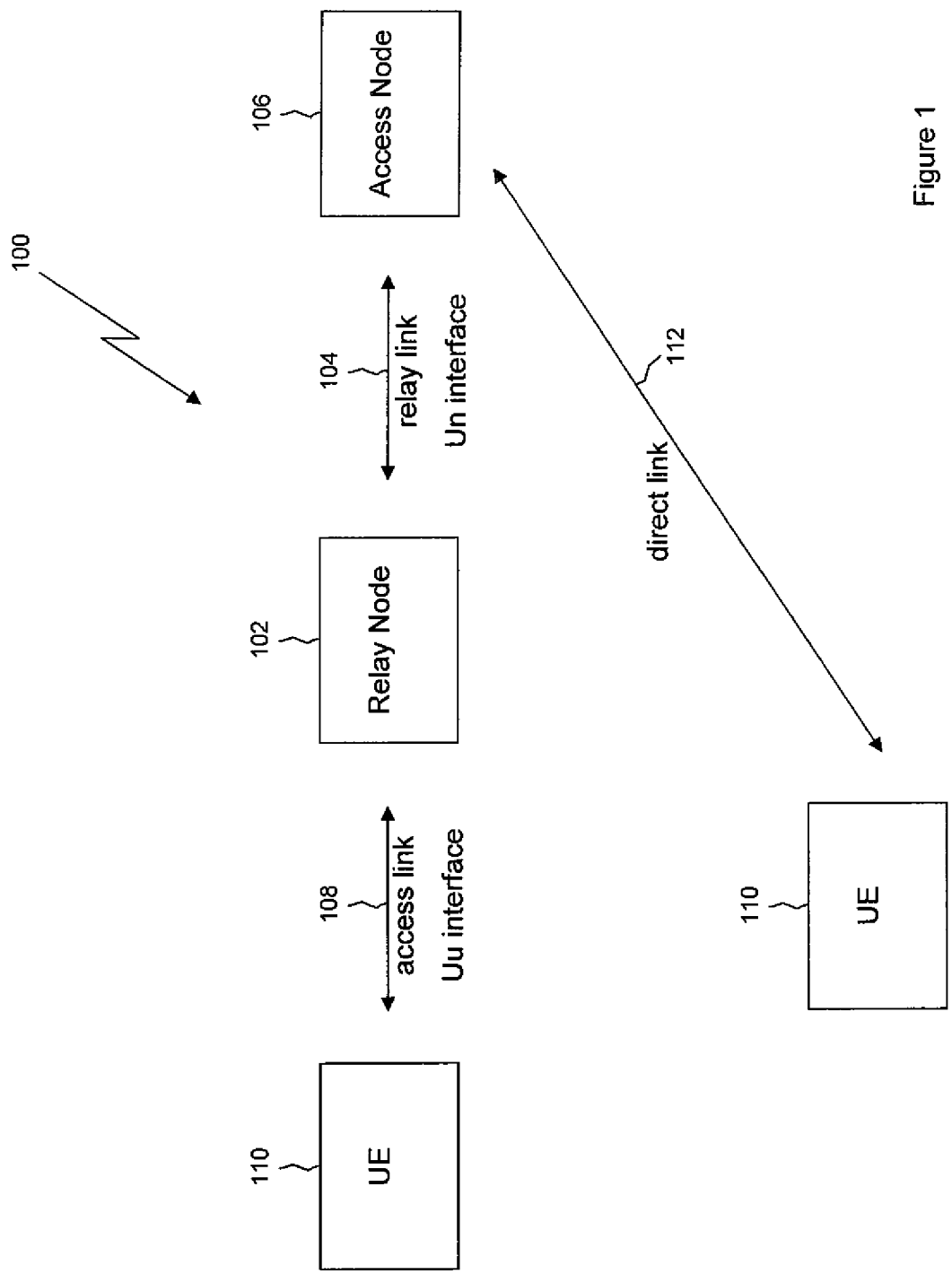
FIG. 1 is a diagram illustrating a wireless communication system that includes a relay node, according to an embodiment of the disclosure.

FIG. 1 is a diagram illustrating a wireless communication system 100 that includes a relay node 102, according to an embodiment of the disclosure. Examples of the wireless communication system 100 include LTE or LTE-A networks, and all of the disclosed and claimed embodiments could be implemented in an LTE-A network. The relay node 102 can receive and amplify a signal received from a UE 110 and transmit the signal to an access node 106. In some implementations of a relay node 102, the relay node 102 receives a signal with data from the UE 110 and then generates a new signal to transmit the data to the access node 106. The relay node 102 can also receive data from the access node 106 and deliver the data to the UE 110.

The relay node 102 might be placed near the edges of a cell so that the UE 110 can communicate with the relay node 102 rather than communicating directly with the access node 106 for that cell. In radio systems, a cell is a geographical area of reception and transmission coverage. Cells can overlap with each other. In a typical situation, one access node is associated with each cell. The size of a cell is determined by factors such as frequency band, power level, and channel conditions. One or more relay nodes, such as relay node 102, can be used to enhance coverage within a cell or to extend the size of coverage of a cell. Additionally, the use of a relay node 102 can enhance throughput of a signal within a cell because the UE 110 can access the relay node 102 at a higher data rate than the UE 110 might use when communicating directly with the access node 106 for that cell, thus creating higher spectral efficiency. The use of a relay node 102 can also decrease the UE's battery usage by allowing the UE 110 to transmit at a lower power.

When the UE 110 is communicating with the access node 106 via the relay node 102, the links that allow wireless communication can be said to be of three distinct types. The communication link between the UE 110 and the relay node 102 is said to occur over an access link 108, which can also be referred to as the Uu interface. The communication between the relay node 102 and the access node 106 is said to occur over a relay link 104, which can also be referred to as the Un interface or the backhaul link. Communication that passes directly between the UE 110 and the access node 106 without passing through the relay node 102 is said to occur over a direct link 112.

Relay nodes can be divided into three kinds: layer one relay nodes, layer two relay nodes, and layer three relay nodes. A layer one relay node is essentially a repeater that can retransmit a transmission without any modification other than amplification and slight delay. A layer two relay node can demodulate/decode a transmission that it receives, re-modulate/re-encode the demodulated/decoded data, and then transmit the re-modulated/re-encoded data. A layer three relay node can have full radio resource control capabilities and can thus function similarly to an access node. The illustrative embodiments herein are primarily concerned with layer two and layer three relay nodes.

The radio resource control protocols used by a relay node may be the same as those used by an access node, and the relay node may have a unique cell identity typically used by an access node. Relay nodes known as Type 1 relay nodes have their own physical cell IDs and transmit their own synchronization signals and reference symbols. Relay nodes known as Type 2 relay nodes do not have separate cell IDs and thus would not create any new cells. That is, a Type 2 relay node does not transmit a physical ID that is different from the access node ID. A Type 2 relay node can relay signals to and from legacy (LTE Release 8) UEs, but Release 8 UEs are not aware of the presence of Type 2 relay nodes. LTE-A Release 10 and later UEs might be aware of the presence of a Type 2 relay node. As used herein, the term "Release 10" refers to any UE capable of following LTE standards later than LTE Release 8, and the term "Release 8" refers to any UE capable of following only the LTE standards of LTE Release 8. In some cases, the embodiments described herein may preferably be implemented in Type 2 relay nodes, but the embodiments may apply to other types of relay nodes as well.

When the UE 110 has data to transmit to the access node 106, the access node can grant the UE 110 a resource that the UE 110 can use for the uplink transmission. When the relay node 102 is present, the relay node 102 can detect the uplink grant information transmitted by the access node 106 and therefore can be aware of when and how the UE 110 will transmit on the uplink. Alternatively, the access node 106 might explicitly signal the uplink grant information to the relay node 102.

When the UE 110 transmits data on the uplink, the data might be successfully decoded by both the relay node 102 and the access node 106 or might be decoded only by the relay node 102, only by the access node 106, or by neither the relay node 102 nor the access node 106. If the access node 106 does not successfully decode the data, the access node 106 might send a negative acknowledgement (NACK) message to the UE 110 and the relay node 102. Both the UE 110 and the relay node 102 might then synchronously retransmit the data to the access node 106.

For both initial transmissions and retransmissions, the UE 110 sends information to the access node 106 that might include a channel quality indicator (CQI), a precoding matrix index (PMI), a rank indication (RI), an ACK/NACK, and/or other information. Such information from the physical layer will be referred to herein as control information. The content that a UE intends to convey, which could include user plane data and/or control plane data from upper layers, will be referred to herein simply as data. The data is typically transmitted on the physical uplink shared channel (PUSCH). In order to maintain the single carrier property of uplink single-carrier frequency division multiple access (UL SC-FDMA), the UE 110 transmits on a set of contiguous subcarriers. If the UE 110 has no data to send, or if there is no PUSCH allocation for the current subframe, the UE 110 transmits the control information via the physical uplink control channel (PUCCH). If the UE 110 has both control information and data to transmit, the UE 110 multiplexes the control information with the data and transmits both of them on the PUSCH.

To help the access node 106 detect signals transmitted by the UE 110, demodulation reference signals (DMRS) are transmitted in the PUSCH so that the access node 106 can estimate the uplink channel before demodulating the data symbols. That is, a signal transmitted by the UE 110 might consist of a series of subframes, each of which might consist of a series of orthogonal frequency division multiplexing (OFDM) symbols. At least one OFDM symbol in each subframe might be a reference symbol, the DMRS, that the access node 106 can read to perform channel estimation on the uplink channel. The access node 106 knows what should be transmitted in the DMRS and can compare the DMRS that is expected to the DMRS that is actually received. The access node 106 can then use this comparison to determine the channel condition between the UE 110 and the access node 106. This process is known as channel estimation. The access node 106 can further use this estimated channel condition to demodulate or decode the data symbols. This process is known as data demodulation.

Figure 2:
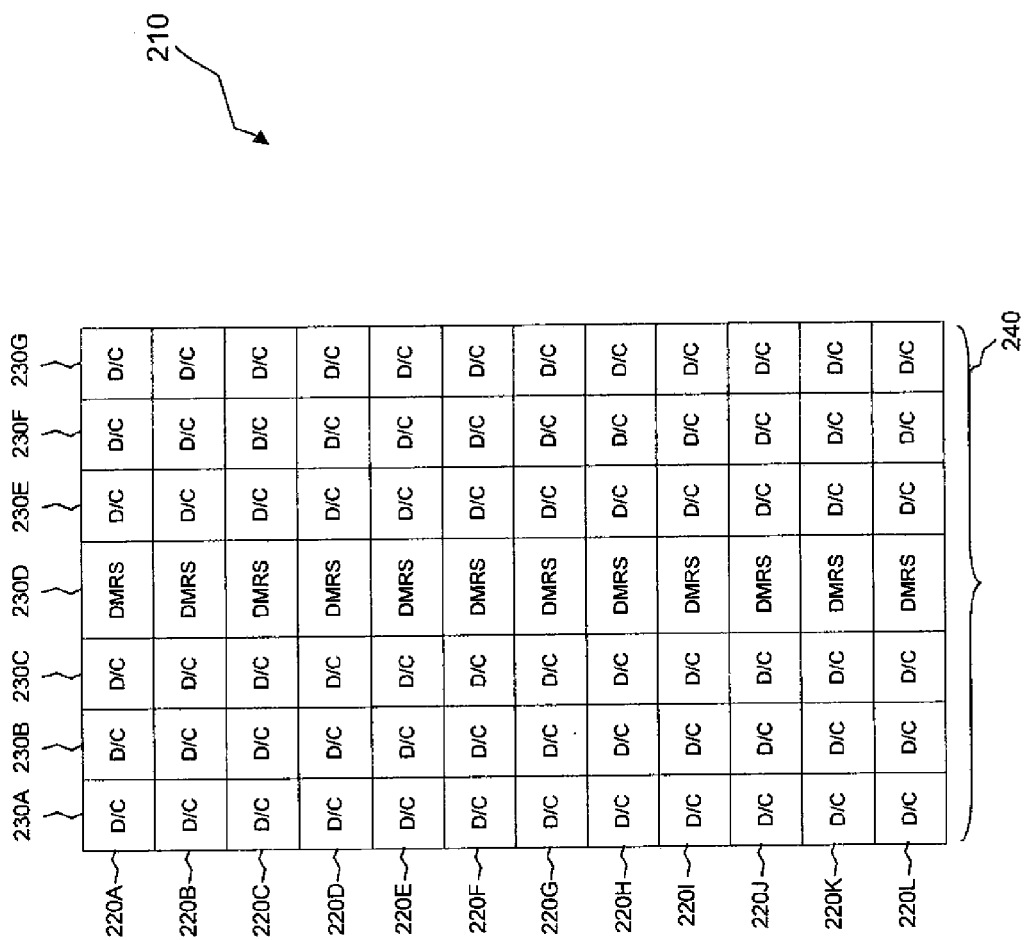
FIG. 2 is a diagram illustrating a typical resource block.

FIG. 2 illustrates an example of a resource block 210, which is a portion of a signal that might be transmitted by the UE 110. The resource block 210 consists of a set of twelve subcarriers 220. Each column 230 in the resource block 210 belongs to an OFDM symbol. In this example and in the examples that will follow, a normal cyclic prefix is assumed, so there are seven OFDM symbols 230 in the resource block 210. If an extended cyclic prefix were used, there would be six OFDM symbols 230 in the resource block 210. While this figure and the following similar figures depict normal cyclic prefixes and the accompanying descriptions deal with normal cyclic prefixes, similar considerations could apply to extended cyclic prefixes.

One OFDM symbol 230 on one subcarrier 220 is referred to as one resource element. Thus, the resource block 210 consists of 84 resource elements, since there are seven OFDM symbols 230 and twelve subcarriers 220 in the resource block 210. A set of seven consecutive OFDM symbols 230 makes up one slot 240. Two slots 240 make up one subframe, and ten subframes make up one radio frame.

The majority of the OFDM symbols 230 in the resource block 210 might contain data and control information multiplexed together. This is represented by the characters "D/C" in all resource elements of OFDM symbols 230A, 230B, 230C, 230E, 230F, and 230G. However, one OFDM symbol per slot typically contains DMRS signals rather than data and control information. In this example, OFDM symbol 230D contains DMRS signals, which are represented by the characters "DMRS". In the similar figures that follow, similar components may be present, and similar characters may be used to refer to similar components. However, for the sake of clarity in the drawings, reference numbers may be omitted for some components.

As mentioned above, the relay node 102 might successfully decode an initial transmission from the UE 110, while the access node 106 might not. The access node 106 might then request a retransmission, and both the UE 110 and the relay node 102 might synchronously retransmit. The UE 110 might multiplex data and control information on the PUSCH for the second transmission. The relay node 102 might know the configuration of the UE's control information by either decoding the radio resource control (RRC) signaling sent by the access node to the UE or by receiving an explicit signal from the access node 106. In other words, the relay node 102 knows where in each subframe the UE 110 will send control information and the amount of control information. However, the relay node 102 has no knowledge of the content of the control information and therefore cannot transmit the control information. As a result, when the relay node 102 and the UE 110 transmit synchronously on the second transmission, the UE 110 will transmit both data and control information, while the relay node 102 will transmit data only. Consequently, the access node 106 will receive data from both the UE 110 and the relay node 102, but will receive control information only from the UE 110.

To assist the access node 106 in performing channel estimation, the relay node 102 could transmit the same DMRS on the same resource elements on which the UE 110 transmits the DMRS. In this case, the access node 106 will receive a combination of the DMRS from the UE 110 and the DMRS from the relay node 102. The access node 106 could then perform a channel estimate based on this combined signal, and this channel estimate could be used to demodulate the data signal. That is, since the UE 110 and the relay node 102 transmit the same DMRS, and since both the UE 110 and the relay node 102 transmit the data, the access node 106 can use the combined DMRS from the UE 110 and the relay node 102 to estimate the channel for the data.

However, this channel estimate based on the combined DMRS from the UE 110 and the relay node 102 cannot be used to demodulate the control information, since the control information is transmitted only by the UE 110. To demodulate the control information, the access node 106 needs to use the DMRS received only from the UE 110, but the DMRS received from the UE 110 alone is different from the combined DMRS received from the UE 110 and the relay node 102. That is, even though the UE 110 and the relay node 102 might have transmitted the same DMRS, each transmitted DMRS might encounter different conditions on the path to the access node 106. Therefore, the combined DMRS received by the access node 106 is different from each transmitted DMRS. A channel estimation performed by the access node 106 on the combined DMRS is not applicable to the DMRS sent by the UE 110 alone or by the relay node 102 alone, and it is the DMRS sent by the UE 110 alone that the access node 106 needs to use to perform channel estimation on the signal from the UE 110 and thereby decode the control information. The inability of the access node 106 to decode the control information may introduce system performance degradation.

In one set of embodiments, techniques are provided such that, when a relay node transmits data simultaneously with a UE transmitting the same data multiplexed with control information, an access node receives a DMRS that was transmitted only by the UE. The access node can then use this DMRS to demodulate the control information. The access node can also receive a combined DMRS from both the UE and the relay node and can use the combined DMRS to decode the data.

Figure 3:
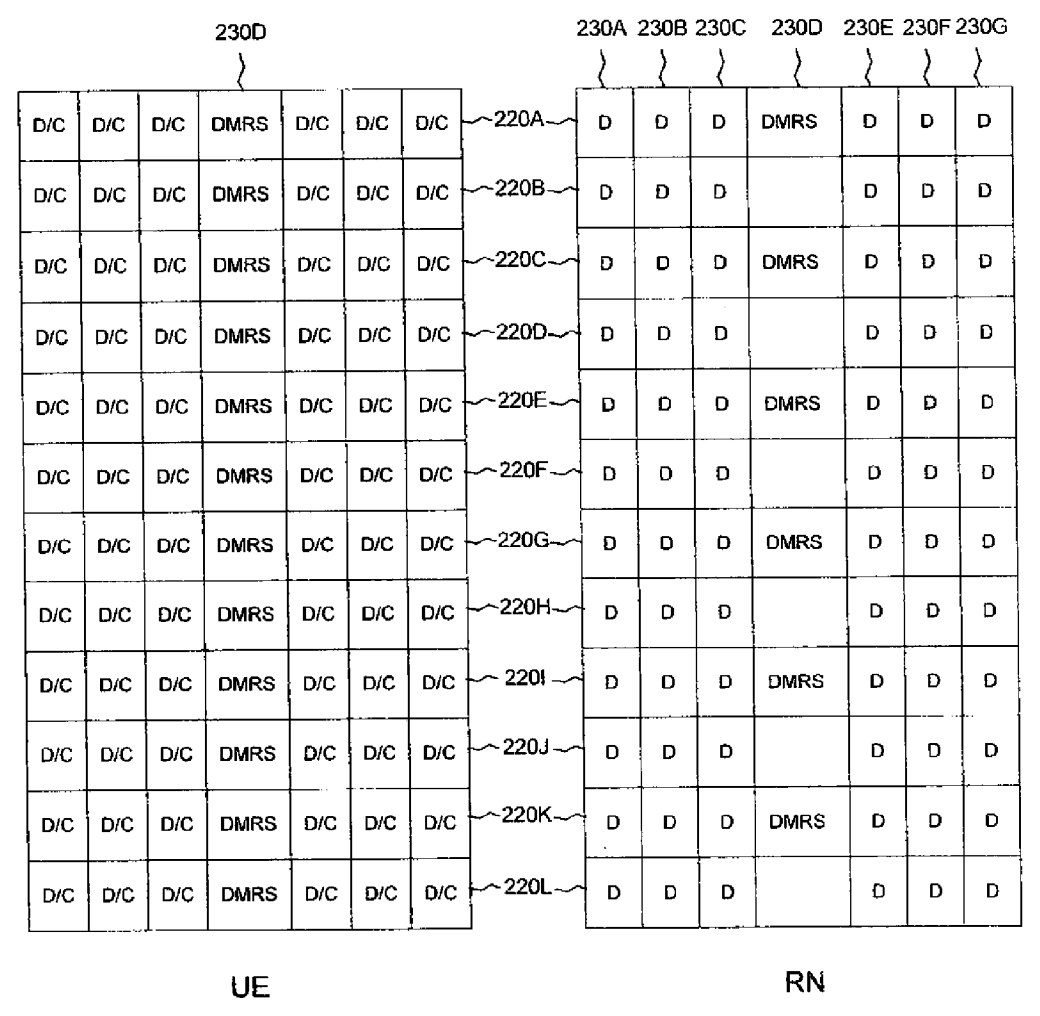

FIG. 3 illustrates an embodiment of one of these techniques, which can be referred to as puncturing of the DMRS from the relay node. The grid on the left depicts a resource block that might be transmitted by a UE under this embodiment, and the grid on the right depicts a resource block that might be transmitted by a relay node (abbreviated RN in the drawing) under this embodiment. In the resource block transmitted by the relay node, resource elements in OFDM symbols 230A, 230B, 230C, 230E, 230F, and 230G are depicted with the character "D" to illustrate that those OFDM symbols contain only data and no control information. While the two resource blocks are depicted side-by-side, it should be understood that the two resource blocks would be transmitted synchronously by the UE and the relay node when the relay node assists in a retransmission made by the UE. That is, the UE and the relay node would transmit DMRS signals in OFDM symbol 230D at substantially the same time.

It can be seen that the UE transmits DMRS signals on all of the resource elements in OFDM symbol 230D, as is typical for Release 8. The relay node, however, transmits DMRS signals on only a subset of the resource elements in OFDM symbol 230D. The DMRS from the relay node can thus be said to be "punctured". In this example, the relay node transmits DMRS signals on the resource elements in subcarriers 220A, 220C, 220E, 220G, 220I, and 220K. On the resource elements in subcarriers 220B, 220D, 220F, 220H, 220J, and 220L, the relay node does not transmit. Therefore, an access node will receive DMRS signals from both the UE and the relay node in subcarriers 220A, 220C, 220E, 220G, 220I, and 220K on OFDM symbol 230D. The access node can use those DMRS signals to perform a channel estimation for the data and thereby decode the data. In subcarriers 220B, 220D, 220F, 220H, 220J, and 220L on OFDM symbol 230D, the access node will receive DMRS signals only from the UE. The access node can use those DMRS signals to perform a channel estimation for the control information and thereby decode the control information.

In other embodiments, other puncture patterns could be used on the relay node. That is, the subcarriers on which the relay node does and does not transmit the DMRS could be different from those shown in FIG. 3. Also, the puncture pattern can change from subframe to subframe. The puncture pattern could be pre-configured at the relay node and the access node, or the access node could send the puncture pattern to the relay node via RRC signaling or some other type of signaling.

The resource blocks shown in FIG. 3 comprise one slot and, as mentioned previously, two slots comprise one subframe. In an embodiment, the relay node transmits the DMRS on same subcarriers in each slot of a subframe. For example, the DMRS might be transmitted on subcarriers 220A, 220C, 220E, 220G, 220I, and 220K in both slots. Alternatively, each slot in a subframe could have a different puncture pattern. For example, in the first slot of a subframe, the DMRS might be transmitted on subcarriers 220A, 220C, 220E, 220G, 220I, and 220K, and in the second slot of a subframe, the DMRS might be transmitted on subcarriers 220B, 220D, 220F, 220H, 220J, and 220L. Having a different puncture pattern in each slot could allow the access node to perform a better channel estimation. Other puncture patterns could be used in the two slots of a subframe, as long as there is one set of subcarriers per slot in which the relay node does not transmit the DMRS and only the UE transmits the DMRS.

Figure 4:
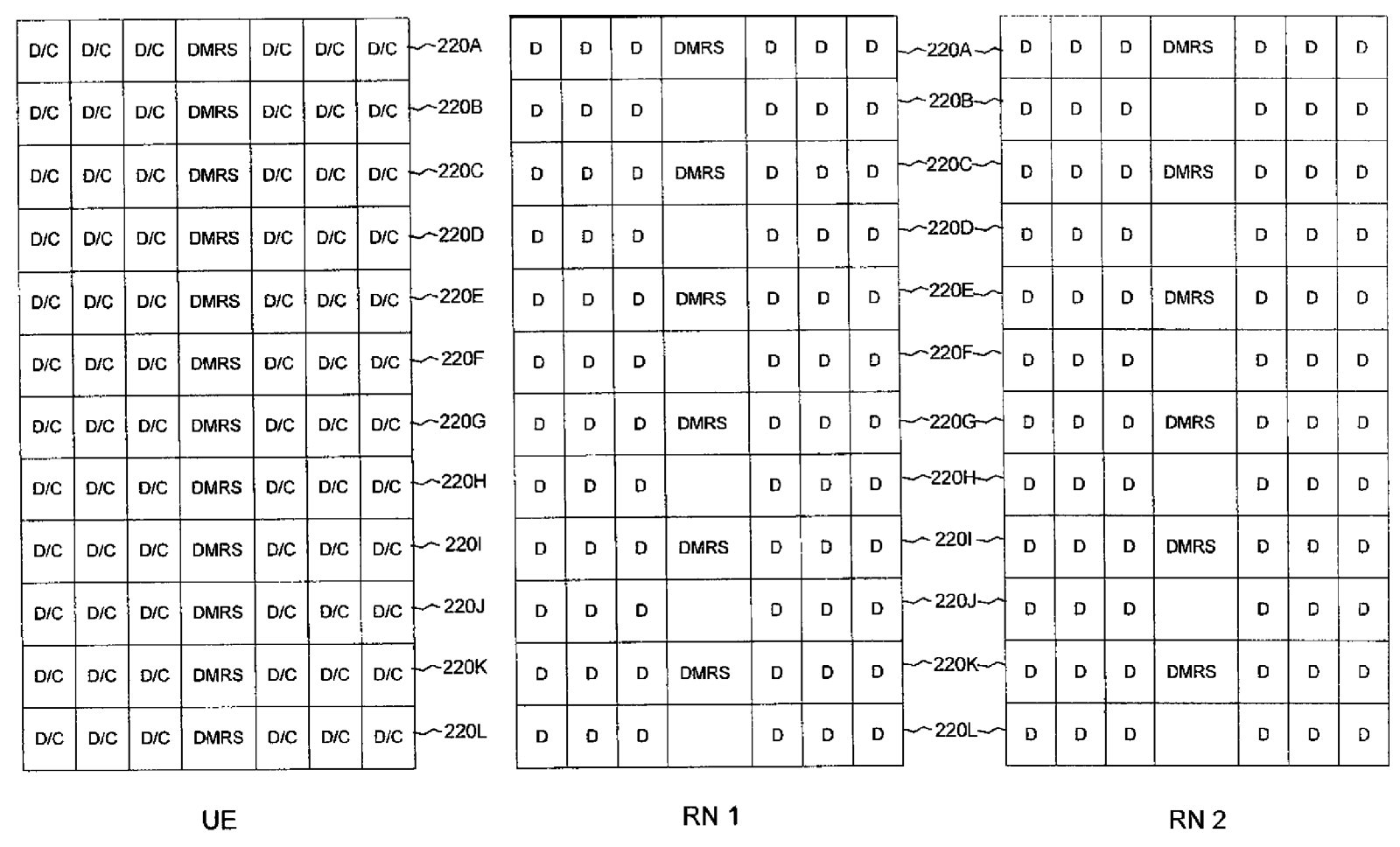

Multiple relay nodes might be present in a cell, and each might be involved in a coordinated retransmission with a UE. In some cases, there may be no need for a separate channel estimate for the retransmissions from each relay node. In such cases, all of the relay nodes might transmit the DMRS on same subcarrier, and the access node might use these DMRS transmissions to decode the data transmitted by the relay nodes and the UE. This scenario is depicted in FIG. 4, where resource blocks that might be transmitted by a first relay node (RN 1) and a second relay node (RN 2) are shown in the center and the right side of the drawing, respectively. In this example, both RN 1 and RN 2 transmit the same DMRS on subcarriers 220A, 220C, 220E, 220G, 220I, and 220K but not on subcarriers 220B, 220D, 220F, 220H, 220J, and 220L. On subcarriers 220B, 220D, 220F, 220H, 220J, and 220L, only the UE transmits the DMRS, and the access node uses these DMRS transmissions to decode the control information transmitted by the UE.

In other cases, a separate channel estimate might be needed for the retransmissions from each of a plurality of relay nodes in a cell. For example, techniques known as transmit diversity and spatial multiplexing are sometimes used to improve the quality of transmissions from UEs and relay nodes. When an access node does not successfully decode a transmission and requests a retransmission, the access node might signal the UE and one or more relay nodes to form transmit diversity or spatial multiplexing for the retransmission. Alternatively, the access node might signal the UE not to retransmit and might signal two relay nodes to form transmit diversity or spatial multiplexing for the retransmission. In such cases, the access node might need to perform a separate channel estimation for each retransmission from each relay node.

In an embodiment, in such cases, each relay node transmits the DMRS on a different subcarrier. The UE, on either the initial transmission, a retransmission, or both, transmits the DMRS on all subcarriers as in the cases described above. On one set of subcarriers in which the UE is transmitting the DMRS, neither relay node transmits the DMRS, and the DMRS is transmitted from UE alone. The access node can perform a channel estimate on the channel from the UE to the access node based on the DMRS signals on the subcarriers on which only the UE is transmitting the DMRS. On the subcarriers on which the UE is transmitting the DMRS along with one of the relay nodes, the access node can perform a channel estimate on the combined channel from the UE to the access node and from that relay node to the access node. The access node can then subtract the channel estimate for the channel from the UE to the access node from the combined channel estimate to calculate a channel estimate for the channel from that relay node alone to the access node. A similar process can be repeated for other relay nodes in the cell to obtain individual channel estimates for the channels from each relay node to the access node.

Figure 5:
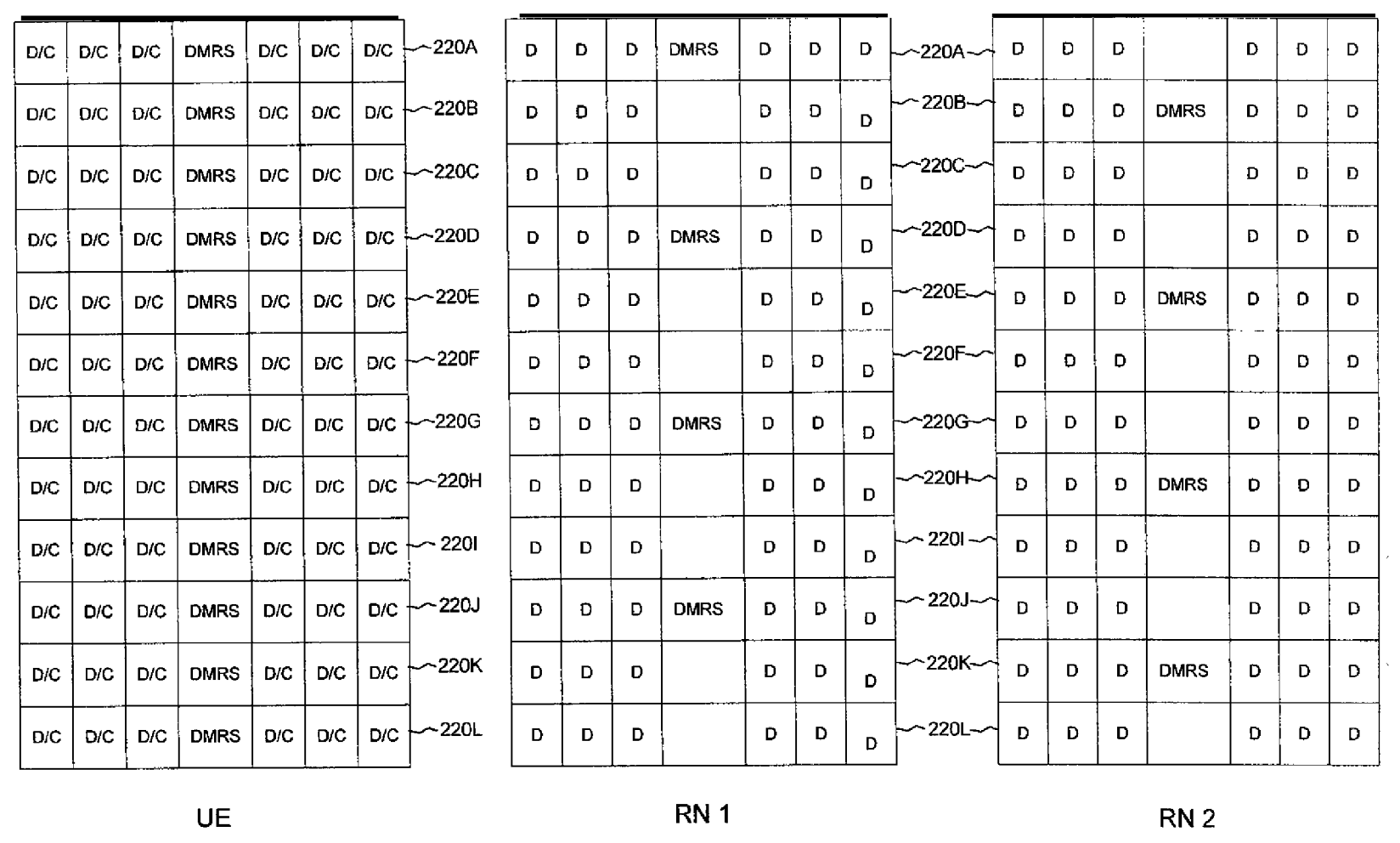

An example of this embodiment is illustrated in FIG. 5. In this example, RN 1 transmits the DMRS on subcarriers 220A, 220D, 220G, and 220J. RN 2 transmits the DMRS on subcarriers 220B, 220E, 220H, and 220K. The UE transmits on all subcarriers, and therefore transmits the DMRS on subcarriers 220C, 220F, 220I, and 220L when neither RN 1 nor RN 2 is transmitting the DMRS. The access node can perform a channel estimate on the channel from the UE to the access node based on the DMRS signals received in subcarriers 220C, 220F, 220I, and 220L. The access node can perform a channel estimate on the combined channel from the UE to the access node and from RN 1 to the access node based on the DMRS signals received in subcarriers 220A, 220D, 220G, and 220J. The access node can then subtract the channel estimate for the channel from the UE alone that was based on the DMRS signals received in subcarriers 220C, 220F, 220I, and 220L from the combined channel estimate based on the DMRS signals received in subcarriers 220A, 220D, 220G, and 220J to calculate the channel estimate for RN 1 alone.

Similarly, the access node can perform a channel estimate on the combined channel from the UE to the access node and from RN 2 to the access node based on the DMRS signals received in subcarriers 220B, 220E, 220H, and 220K. The access node can then subtract the channel estimate for the channel from the UE alone from the combined channel estimate based on the DMRS signals received in subcarriers 220B, 220E, 220H, and 220K to calculate the channel estimate for RN 2 alone.

In other embodiments, other puncture patterns could be used by the relay nodes, as long as there is one set of subcarriers on which only the UE transmits the DMRS and there is another set of subcarriers for each relay node on which that relay node and the UE transmit the DMRS together but no other relay node transmits the DMRS.

Figure 6:
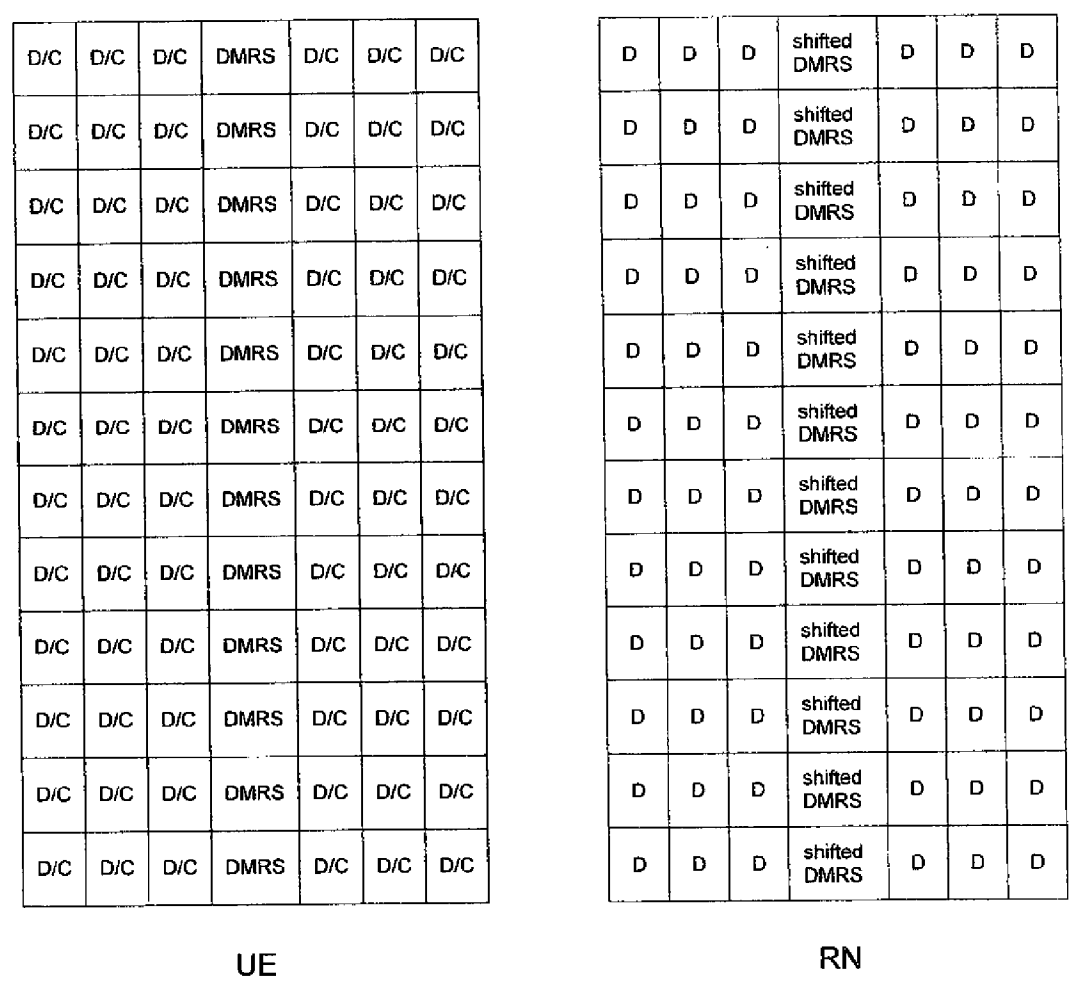

In an alternative set of embodiments, the DMRS transmitted by a relay node is not punctured but is instead made orthogonal to the DMRS transmitted by a UE. One such embodiment, in which only a single relay node is present in a cell, is illustrated in FIG. 6. In FIG. 6, a diagram illustrating resource blocks with orthogonal demodulation reference signals according to an embodiment of the disclosure is shown. Although FIG. 6 refers to "shifted DMRS", this is merely an example of implementing orthogonal DMRS. Other schemes (e.g., Pseudo Noise sequence) can also be used to ensure the orthogonality of the DMRS. It can be seen that the relay node transmits the DMRS on the same resource elements in which the UE transmits the DMRS. However, the DMRS sequence transmitted by the relay node uses a different cyclic shift from the DMRS sequence transmitted by the UE. In this way, an access node can obtain separate channel estimates for the channel from the UE to the access node and for the channel from the relay node to the access node. The access node can use the channel estimate for the channel from the UE to the access node to demodulate the control signal. The access node can add the channel estimate for the channel from the UE to the access node to the channel estimate for the channel from the relay node to the access node. The access node can then use the sum of these two channel estimates to demodulate the data signal.

For Release 8 UEs, the cyclic shift of the DMRS in a slot ns is given as $\alpha = 2\pi n_{cs}/12$, where $$n_{cs,UE} = (n_{DMRS}^{(1)} + n_{DMRS}^{(2)} + n_{PRS}(n_s)) \bmod 12$$

The value of $n_{DRMS}^{(1)}$ ends on the parameter cyclicShift provided by higher layers. $n_{DMRS}^{(2)}$ depends on the cyclic shift for the DMRS field in the most recent DCI format 0 associated with the corresponding PUSCH transmission. For a semi-persistently configured PUSCH transmission, $n_{DMRS}^{(2)}$ is set to zero. $n_{PRS}(n_s)$ is a function of slot index $n_s$.

In an embodiment, the relay node's DMRS sequence is made orthogonal to that of UE by using the following equation in the calculation of the cyclic shift for the relay node:

$$n_{cs,RN} = (n_{DMRS}^{(1)} + n_{DMRS}^{(2)} + n_{PRS}(n_s) + \text{delta}) \bmod 12$$

The delta value that is associated with the amount of cyclic shift could be pre-configured at both the relay node and the access node without any signaling. Alternatively, the delta value could be transmitted from the access node to the relay node via RRC signaling or some other type of signaling.

When multiple relay nodes are present in a cell and there is no need for a separate channel estimate for each relay node, the same DMRS signal (for example, the same cyclic shift) can be used for all of the relay nodes. The access node can use the channel estimate for the channel from the UE to the access node to demodulate the control signal and can use the channel estimate for the combined channels from the UE and all of the relay nodes to demodulate the data signal. A different cyclic shift could be used for each relay node, and the access node could derive separate channel estimates for each channel from a relay node to the access node, but this might waste orthogonal DMRS sequences.

When multiple relay nodes are present in a cell, there may be some cases, such as when transmit diversity or spatial multiplexing is used, when there is a need for a separate channel estimate for each relay node. In such cases, each relay node can use a different cyclic shift for the DMRS. For example, in the equation given above for creating a DMRS orthogonal to that from the UE, a different delta value can be used for each relay node. The different delta values could be pre-configured at all of the relay nodes and at the access node without any signaling or could be transmitted from the access node to the relay nodes via RRC signaling or some other type of signaling.

Figure 7:
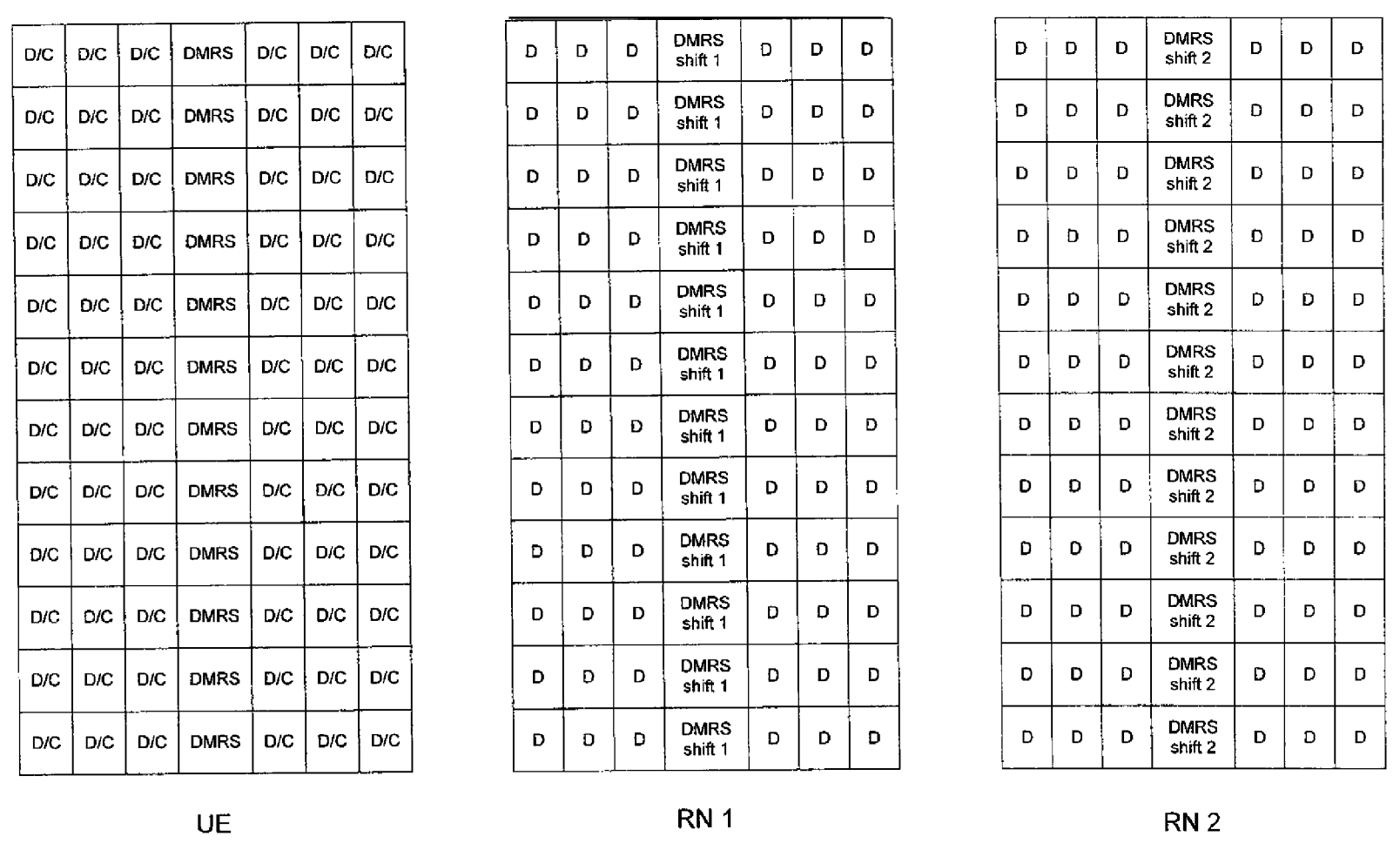

An example of this embodiment is illustrated in FIG. 7. In FIG. 7, a diagram illustrating resource blocks with three different orthogonal demodulation reference signals according to an embodiment of the disclosure is shown. Although FIG. 7 refers to "DMRS shift", this is merely an example of implementing orthogonal DMRS. Other schemes (e.g. Pseudo Noise sequence) can also be used to ensure the orthogonality of the DMRS. In FIG. 7, the DMRS from RN 1 uses a first cyclic shift and the DMRS from RN 2 uses a second cyclic shift. The access node can use the channel estimate based on the DMRS received from the UE to demodulate the signal from the UE and can use the channel estimates based on the DMRS signals received from each of the relay nodes to demodulate the signals from each of the relay nodes.

The use of orthogonal DMRS sequences is applicable to uplink multi-user multiple input/multiple output (MU-MIMO) scenarios in which the two UEs may be associated with the same relay node or different relay nodes. If two UEs are associated with different relay nodes, different orthogonal DMRS sequences may be assigned to the UEs and the relay nodes. If two UEs are associated with the same relay node, the relay node may need to have two or more transmit antennas to the access node, as the relay node may need to help the retransmissions from both UEs on the same resource blocks. The transmission from the relay node to the access node could be operated as two-layer spatial multiplexing. Different orthogonal DMRS sequences may be assigned to the UEs and the two layers from the relay node. The DMRS transmitted by the relay node could be precoded or non-precoded.

The solutions described above can apply to both Release 8 UEs and Release 10 UEs. That is, no modifications would be needed to Release 8 UEs in order to implement these solutions, but Release 10 UEs could also implement these solutions. If a Release 10 UE is aware that a relay node is present, additional solutions are available. In an embodiment, an access node could inform a Release 10 UE that one or more relay nodes are present, and the UE could be aware of when it is transmitting by itself and when it is being assisted by a relay node. If the UE knows that is transmitting by itself, it can transmit the DMRS in all subcarriers.

Alternatively, if a Release 10 UE knows that it is being assisted in a retransmission by one or more relay nodes, the UE might not transmit the DMRS in all subcarriers. That is, since modifications can be made to the manner in which Release 10 UEs transmit the DMRS, the DMRS transmitted by a Release 10 UE can be punctured, as described above for the DMRS transmitted by a relay node. If a separate channel estimate is not needed for each relay node, each relay node can transmit the DMRS on the same subcarriers, and the UE can transmit the DMRS on subcarriers different from those on which the relay nodes transmit the DMRS.

Figure 8:
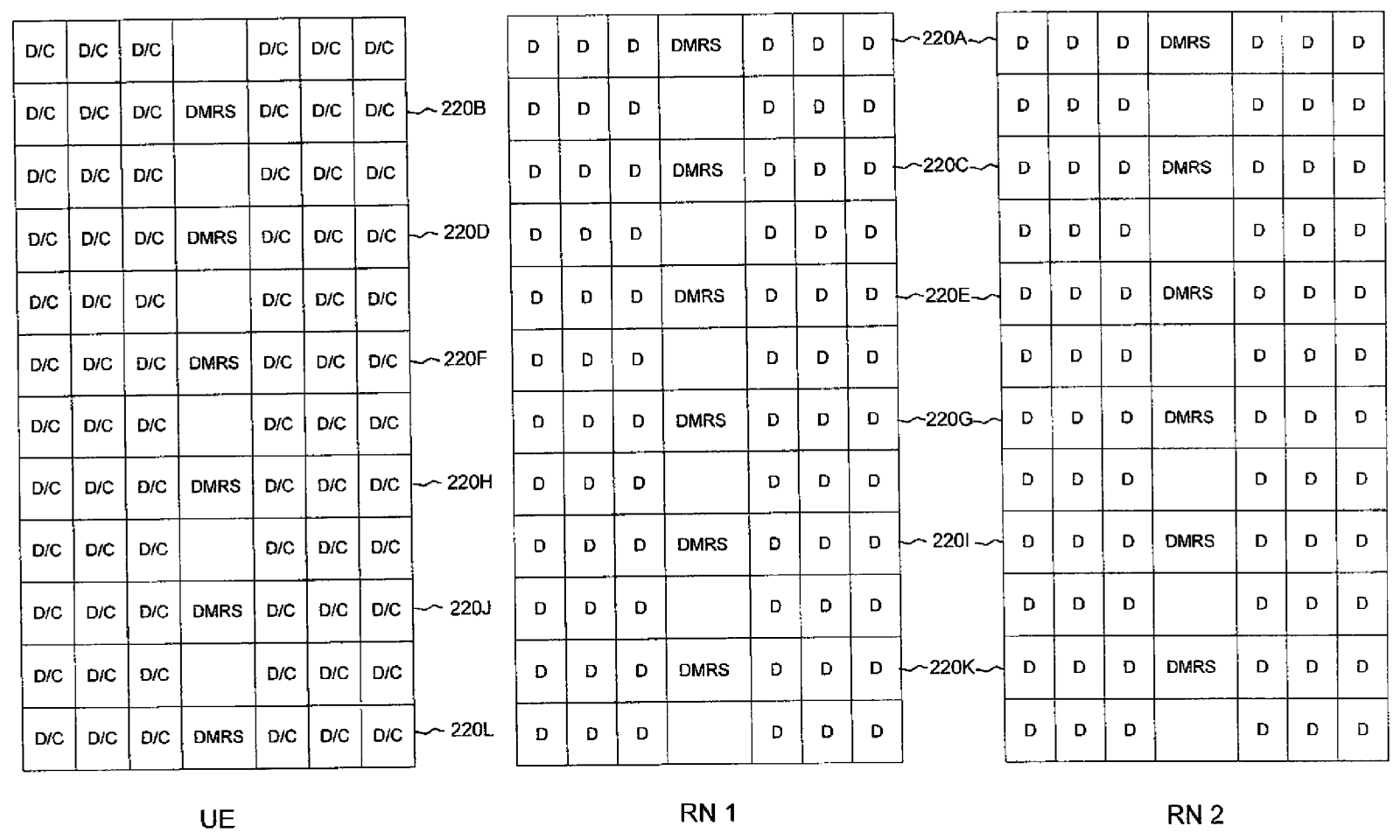

An example of this embodiment is illustrated in FIG. 8. The UE knows that it is being assisted by at least one relay and, in this example, transmits the DMRS only in subcarriers 220B, 220D, 220F, 220H, 220J, and 220L. RN 1 and RN 2 transmit the DMRS only in subcarriers 220A, 220C, 220E, 220G, 220I, and 220K. The access node can use the channel estimate based on the DMRS signals received from the UE to demodulate the signal from the UE and can use the channel estimate based on the DMRS signals received from the relay nodes to demodulate the signals from the relay nodes. In alternative embodiments, the UE could have a puncture pattern different from that depicted, and the relay nodes could have a puncture pattern different from that of the UE but the same as each other's. The puncture patterns could be pre-configured at the relay nodes and at the access node without any signaling or could be transmitted from the access node to the relay nodes via RRC signaling or some other type of signaling. The access node can inform the UE of the puncture pattern that the UE should use via RRC signaling or physical downlink control channel (PDCCH) signaling.

Figure 9:
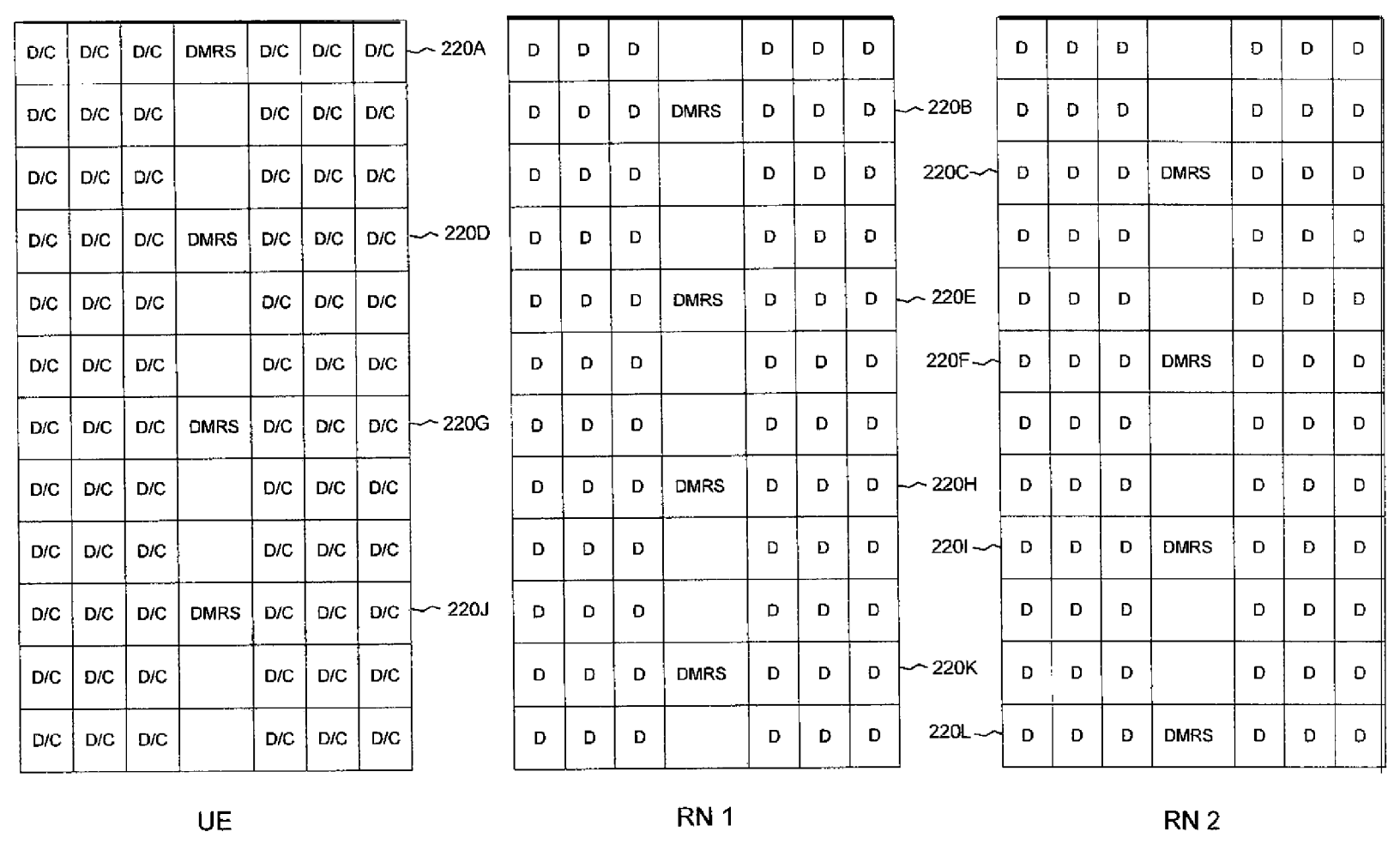

If a separate channel estimate is needed for each of a plurality of relay nodes, the UE and each of the relay nodes can transmit the DMRS with a different puncture pattern. An example of this embodiment is illustrated in FIG. 9, where the UE transmits the DMRS on subcarriers 220A, 220D, 220G, and 220J, RN1 transmits the DMRS on subcarriers 220B, 220E, 220H, and 220K, and RN2 transmits the DMRS on subcarriers 220C, 220F, 220I, and 220L. That is, frequency division multiplexing, in which each of the three components transmits the DMRS on a different subcarrier, is used. The access node can use the channel estimate based on the DMRS signals received from each of these components to demodulate each of the signals from each of these components. In alternative embodiments, the UE and the relay nodes could have puncture patterns different from those depicted and all different from each other. The puncture patterns could be pre-configured at the relay nodes and at the access node without any signaling or could be transmitted from the access node to the relay nodes via RRC signaling or some other type of signaling. The access node can inform the UE of the puncture pattern that the UE should use via RRC signaling or PDCCH signaling.

Figure 10:
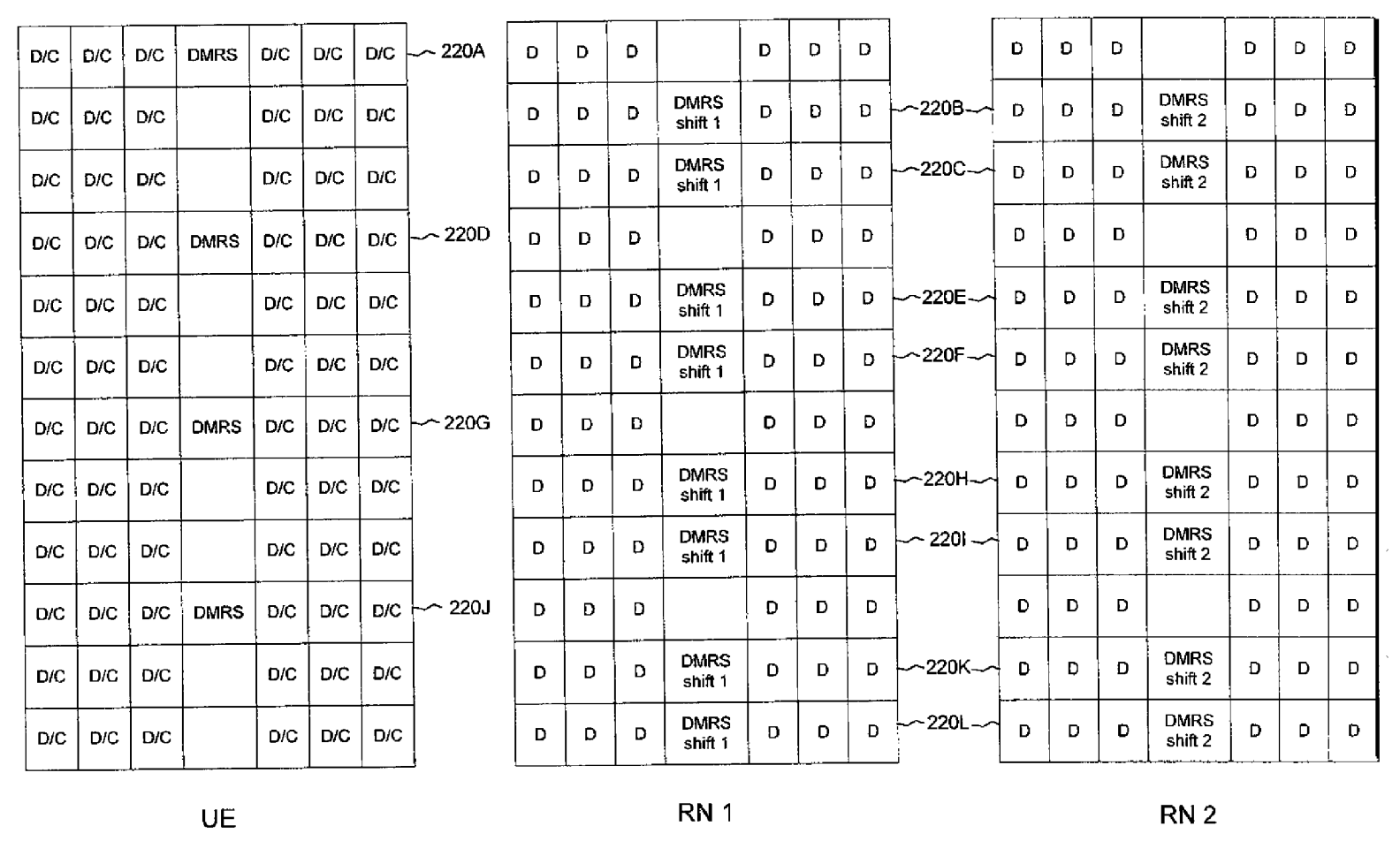

An example of an alternative embodiment for the case where a separate channel estimate is needed for each of a plurality of relay nodes is illustrated in FIG. 10. Although FIG. 10 refers to "DMRS shift", this is merely an example of implementing orthogonal DMRS. Other schemes (e.g., Pseudo Noise sequence) can also be used to ensure the orthogonality of the DMRS. In this case, a combination of frequency division multiplexing (FDM) and code division multiplexing (CDM) is used. The UE transmits a DMRS on subcarriers 220A, 220D, 220G, and 220J. RN 1 transmits a DMRS on subcarriers 220B, 220C, 220E, 220F, 220H, 220I, 220K, and 220L. RN 2 also transmits a DMRS on subcarriers 220B, 220C, 220E, 220F, 220H, 220I, 220K, and 220L, but RN 2 transmits a DMRS orthogonal to that of RN 1. That is, FDM is used so that the UE and the relay nodes transmit on different resource elements, and CDM is used so that the relay nodes transmit DMRS signals orthogonal to each other. In FIG. 10, there may be multiple ways to implement orthogonal DMRS signals among different RNs. For example, DMRS on two consecutive resource elements (220B and 220C, 220E and 220F, 220H and 220I, 220K and 220L) can be made to be orthogonal among different RNs. Alternatively, DMRS on other combination of resource elements can be made to be orthogonal among different RNs. The transmission of the DMRS signals from the relay nodes on consecutive subcarriers as shown can improve the channel estimate made by the access node. In other embodiments, the UE and the relay nodes could have different puncture patterns that provide a combination of FDM and CDM.

Figure 11:
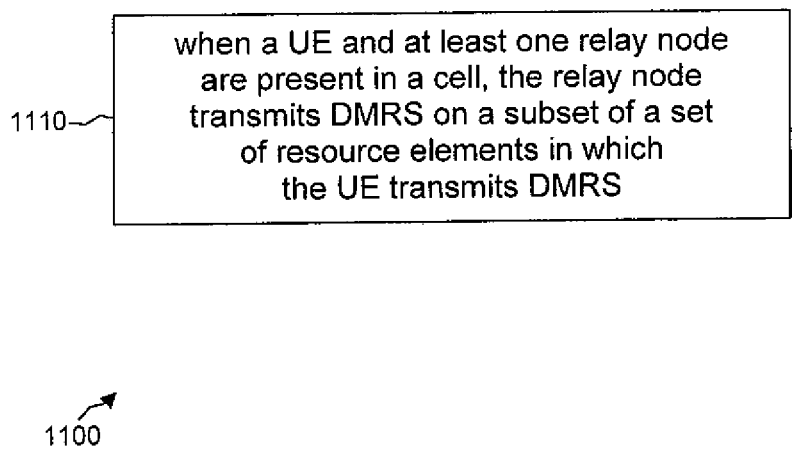
FIG. 11 is a flowchart of a method for providing an access node with a demodulation reference signal according to an embodiment of the disclosure.

FIG. 11 illustrates an embodiment of a method 1100 for providing an access node with a DMRS. At block 1110, when the UE and at least one relay node are present in a cell, the relay node transmits the DMRS on a subset of a set of resource elements in which the UE transmits the DMRS.

Figure 12:
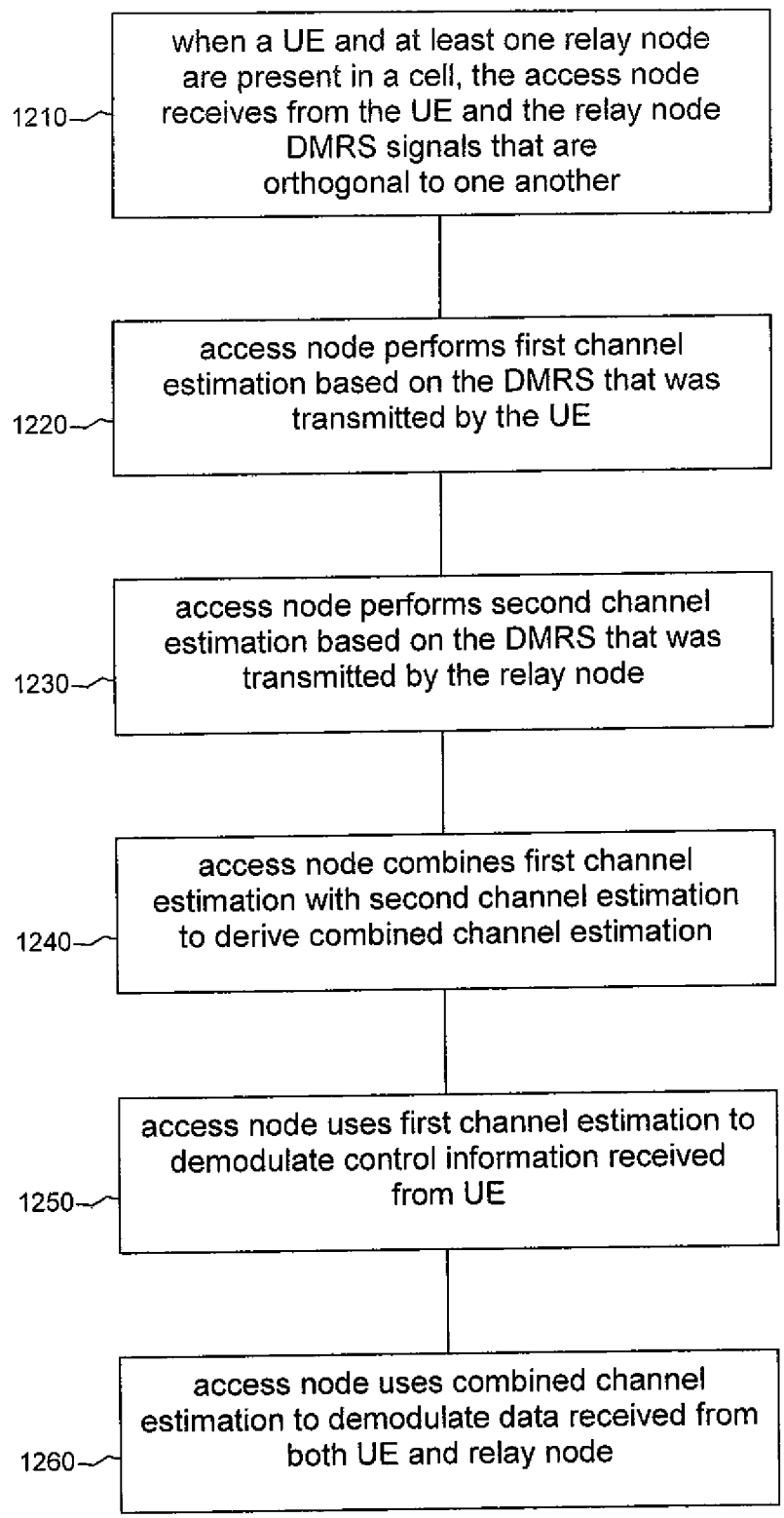
FIG. 12 is a flowchart of a method for an access node to perform channel estimation according to an embodiment of the disclosure.

FIG. 12 is a flowchart of a method for an access node to perform channel estimation according to an embodiment of the disclosure. At block 1210, when a UE and at least one relay node are present in a cell, the access node receives from the UE and the relay node DMRS signals that are orthogonal to one another. At block 1220, the access node performs a first channel estimation based on the DMRS that was transmitted by the UE. At block 1230, the access node performs a second channel estimation based on the DMRS that was transmitted by the relay node. At block 1240, the access node combines the first channel estimation with the second channel estimation to derive a combined channel estimation. At block 1250, the access node uses the first channel estimation to demodulate control information received from the UE. At block 1260, the access node uses the combined channel estimation to demodulate data received from both the UE and the relay node.

Figure 13:
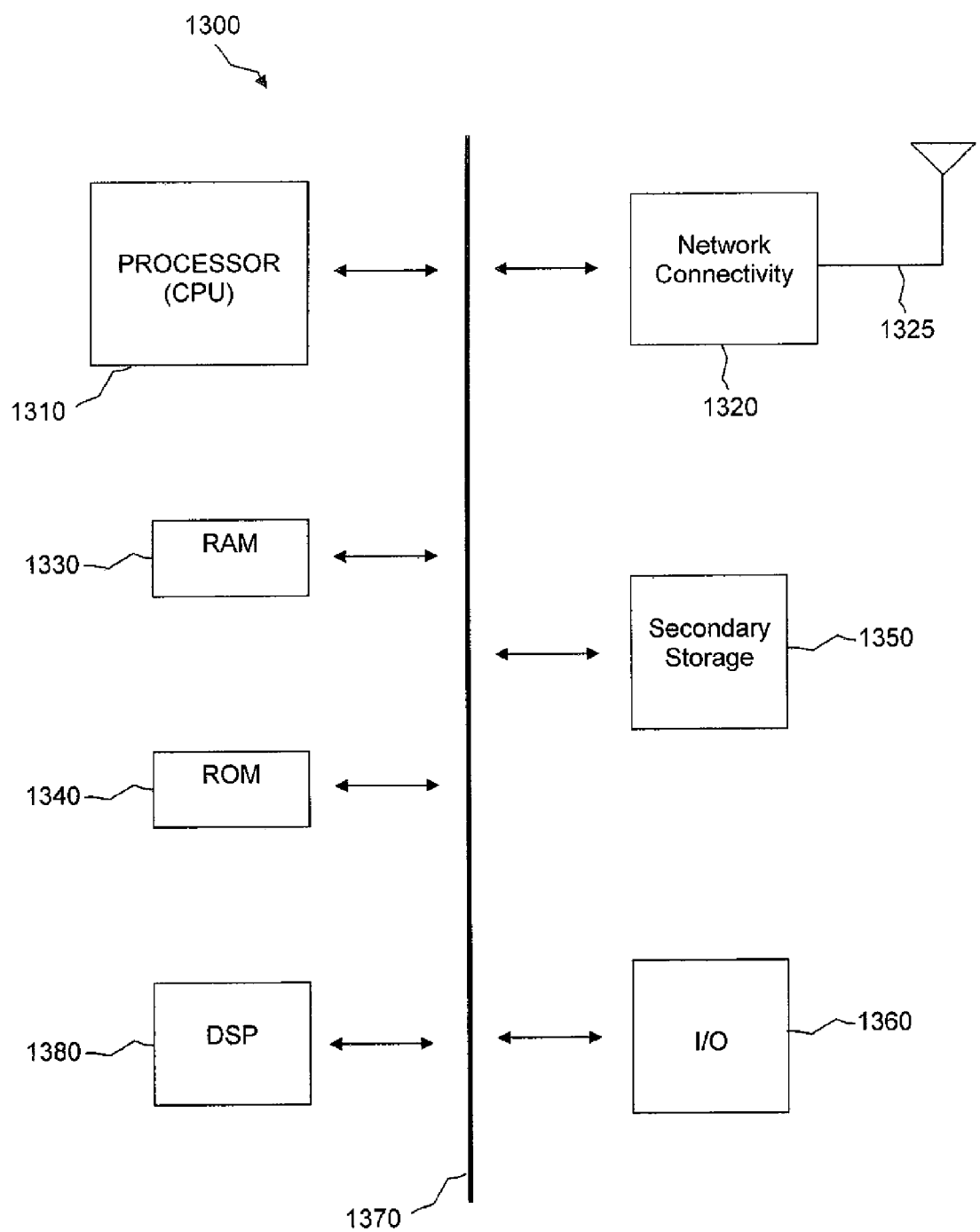
FIG. 13 illustrates a processor and related components suitable for implementing the several embodiments of the present disclosure.

The UA 110, the relay node 102, the access node 106, and other components described above might include a processing component that is capable of executing instructions related to the actions described above. FIG. 13 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

The following are incorporated herein by reference for all purposes: 3GPP TS 36.814, 3GPP TR 36.211, and 3GPP TR 36.331.

In an embodiment, a method is provided for providing an access node with a demodulation reference signal (DMRS). The method includes, when the UE and at least one relay node are present in a cell, the relay node transmitting the DMRS on a subset of a set of resource elements in which the UE transmits the DMRS.

In another embodiment, a relay node is provided. The relay node includes a processor configured such that, when a user equipment (UE) is present in a cell with the relay node, the relay node transmits a demodulation reference signal (DMRS) on a subset of a set of resource elements in which the UE transmits the DMRS.

In another embodiment, a Long Term Evolution-Advanced (LTE-A) Release 10 user equipment (UE) is provided. The UE includes a processor configured such that, when a plurality of relay nodes are present in a cell with the UE, the UE transmits a demodulation reference signal (DMRS) on a set of resource elements available to the UE and the relay nodes.

In another embodiment, a method for providing an access node with a demodulation reference signal (DMRS) that was transmitted only by a Long Term Evolution-Advanced (LTE-A) Release 10 user equipment (UE) is provided. The method includes, when a plurality of relay nodes are present in a cell with the UE, the UE transmitting a demodulation reference signal (DMRS) on a set of resource elements available to the UE and the relay nodes.

In another embodiment, an access node is provided. The access node includes a processor configured such that when a user equipment (UE) and at least one relay node are present in a cell with the access node, the access node receives a demodulation reference signal (DMRS) that was transmitted only by the UE and a combined DMRS that was transmitted by the UE and by the at least one relay node.

In another embodiment, a method for providing an access node with a demodulation reference signal (DMRS) that was transmitted only by a user equipment (UE) is provided. The method includes, when the UE and at least one relay node are present in a cell with the access node, the access node receiving a demodulation reference signal (DMRS) that was transmitted only by the UE and a combined DMRS that was transmitted by the UE and by the at least one relay node.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for providing an access node with a demodulation reference signal (DMRS), comprising:

when a user equipment (UE) and at least one relay node are present in a cell, the relay node transmitting the DMRS on a subset of a set of resource elements in which the UE transmits the DMRS.

2. The method of claim 1, wherein the relay node transmits the DMRS in each slot of a subframe, wherein both slots have the same puncture pattern.

3. The method of claim 1, wherein, when a plurality of relay nodes are present in the cell, all of the relay nodes transmit the DMRS on the same resource elements.

4. The method of claim 1, wherein, when a plurality of relay nodes are present in the cell, the UE transmits the DMRS on a first subset of a set of resource elements in a first resource block and all of the relay nodes transmit the DMRS on a second subset of the set of resource elements in a second resource block, the first subset and the second subset being different, and the first resource block and the second resource block being transmitted synchronously.

5. The method of claim 1, wherein, when a plurality of relay nodes are present in the cell, the UE transmits the DMRS on a first subset of a set of resource elements in a first resource block and all of the relay nodes transmit the DMRS on a second subset of the set of resource elements in a second resource block, the first subset and the second subset being different, and DMRS transmitted by the relay nodes is orthogonal to the DMRS transmitted by each other relay node.

6. A relay node comprising:

a processor configured such that, when a user equipment (UE) is present in a cell with the relay node, the relay node transmits a demodulation reference signal (DMRS) on a subset of a set of resource elements in which the UE transmits the DMRS.

7. The relay node of claim 6, wherein information related to the subset of resource elements in which the relay node transmits the DMRS is one of:
preconfigured in the relay node; and
wirelessly transmitted to the relay node.

8. The relay node of claim 6, wherein the relay node transmits the DMRS in each slot of a subframe, wherein both slots have different puncture patterns.

9. The relay node of claim 6, wherein, when a plurality of relay nodes are present in the cell, each of the relay nodes transmits the DMRS on different resource elements.

10. The relay node of claim 9, on all resource elements in a resource block wherein the UE transmits the DMRS, and wherein, on at least one resource element on which the UE is transmitting the DMRS, none of the relay nodes transmits the DMRS.

11. The relay node of claim 6, wherein, when a plurality of relay nodes are present in the cell, the UE and each of the relay nodes transmit the DMRS on different subsets of a set of resource elements in a set of synchronously transmitted resource blocks.

12. The relay node of claim 6, wherein, when a plurality of relay nodes are present in the cell, the UE transmits the DMRS on a first subset of a set of resource elements available to the UE and the relay nodes, and all of the relay nodes transmit the DMRS on a second subset of the set of resource elements available to the UE and the relay nodes, the first subset and the second subset being different, and resource blocks containing the first subset and the second subset being transmitted synchronously, and DMRS transmitted by the relay nodes is orthogonal to the DMRS transmitted by each other relay node.

13. A user equipment (UE) comprising:
a processor configured such that, when a plurality of relay nodes are present in a cell with the UE, the UE transmits a demodulation reference signal (DMRS) on a first subset of a set of resource elements available to the UE and the relay nodes.

14. The UE of claim 13, wherein the UE and each of the relay nodes transmit the DMRS on different subsets of the set of resource elements available to the UE and the relay nodes, and resource blocks containing the different subsets being transmitted synchronously.

15. The UE of claim 13, wherein information related to the first and second subsets is one of:
preconfigured in the UE and the relay nodes; and
wirelessly transmitted to the UE and the relay nodes.

16. A method for providing an access node with a demodulation reference signal (DMRS) that was transmitted only by a user equipment (UE), comprising:
when a plurality of relay nodes is present in a cell with the UE, the UE transmitting a demodulation reference signal (DMRS) on a first subset of a set of resource elements available to the UE and the relay nodes, wherein the UE transmit the DMRS on different subsets of the set of resource elements than the relay nodes, and wherein resource blocks containing the different subsets are transmitted synchronously.

17. The method of claim 16, wherein all of the relay nodes transmit the DMRS on a second subset of the set of resource elements available to the UE and the relay nodes, the first subset and the second subset being different, and resource blocks containing the first subset and the second subset being transmitted synchronously.

18. The method of claim 16, wherein all of the relay nodes transmit the DMRS on a second subset of the set of resource elements available to the UE and the relay nodes, the first subset and the second subset being different, wherein resource blocks containing the first subset and the second subset being transmitted synchronously, and wherein each DMRS transmitted by the relay nodes is orthogonal to the DMRS transmitted by each other relay node.

19. An access node comprising:
a processor configured such that when a user equipment (UE) and at least one relay node are present in a cell with the access node, the access node receives a demodulation reference signal (DMRS) that was transmitted only by the UE, the access node receives a combined DMRS that was transmitted by the UE and by the at least one relay node, each DMRS transmitted synchronously, and the access node derives channel estimates from each of the DMRS and the combined DMRS and uses the channel estimates to demodulate data and control information.

20. The access node of claim 19, wherein, when a plurality of relay nodes are present in the cell, the access node receives the DMRS from the plurality of relay nodes in the same resource elements.

21. The access node of claim 20, wherein the access node performs a first channel estimation based on the DMRS that was transmitted only by the UE, and the access node uses the first channel estimation to demodulate control information received from the UE, and wherein the access node performs a second channel estimation based on the combined DMRS that was transmitted by the UE and by the plurality of relay nodes, and the access node uses the second channel estimation to demodulate data received from the UE and from the plurality of relay nodes.

22. The access node of claim 19, wherein, when a plurality of relay nodes are present in the cell, the access node receives the DMRS from the UE on a first subset of a set of resource elements available to the UE and the relay nodes, and the access node receives the DMRS from all of the relay nodes on a second subset of the set of resource elements available to the UE and the relay nodes, the first subset and the second subset being different, and resource blocks containing the first subset and the second subset being transmitted synchronously.

23. The access node of claim 22, wherein the access node performs a first channel estimation based on the DMRS that was received from the UE, and the access node uses the first channel estimation to demodulate control information received from the UE, and wherein the access node performs a second channel estimation based on the DMRS that was received from the plurality of relay nodes, and the access node uses the second channel estimation to demodulate data received from the UE and from the plurality of relay nodes.

24. The access node of claim 19, wherein, when a plurality of relay nodes are present in the cell, the access node receives the DMRS from the UE in a first subset of a set of resource elements available to the UE and the relay nodes, and the access node receives the DMRS from all of the relay nodes in a second subset of the set of resource elements available to the UE and the relay nodes, the first subset and the second subset being different, and resource blocks containing the first subset and the second subset being transmitted synchronously, and each DMRS received from the relay nodes is orthogonal to the DMRS received from each other relay node.

25. The access node of claim 24, wherein the access node performs a first channel estimation based on the DMRS that was received from the UE, and the access node uses the first channel estimation to demodulate control information received from the UE, and wherein the access node performs at least one additional channel estimation based on at least one DMRS that was received from at least one of the plurality of relay nodes, and the access node uses the at least one additional channel estimation to demodulate a signal received from the at least one of the plurality of relay nodes.

26. A method for providing an access node with a demodulation reference signal (DMRS), comprising:

when a user equipment (UE) and at least one relay node are present in a cell with the access node, the access node receiving a demodulation reference signal (DMRS) that was transmitted only by the UE and receiving a combined DMRS that was transmitted by the UE and by the at least one relay node, each DMRS transmitted synchronously, and the access node deriving channel estimates from each of the DMRS and the combined DMRS and using the channel estimates to demodulate data and control information.

27. The method of claim 26, wherein the access node receives the combined DMRS on a first subset of a set of resource elements in which the UE transmits the DMRS, and the access node receives the DMRS that was transmitted only by the UE on a second subset of the set of resource elements in which the UE transmits the DMRS, the first subset and the second subset being different.

28. The method of claim 27, wherein the access node performs a first channel estimation based on the DMRS that was transmitted only by the UE, wherein the access node uses the first channel estimation to demodulate control information received from the UE.

29. The method of claim 26, wherein, when a plurality of relay nodes are present in the cell, the access node receives the DMRS from the plurality of relay nodes in different resource elements.

30. The method of claim 29, wherein the access node receives the DMRS from the UE in all resource elements in a resource block, wherein the access node does not receive the DMRS from any of the plurality of relay nodes on at least one of the resource elements on which the DMRS is received from the UE.

* * * * *